United States Patent
Belmar et al.

(10) Patent No.: US 10,430,246 B2
(45) Date of Patent: Oct. 1, 2019

(54) VIRTUALIZED AND SYNCHRONOUS ACCESS TO HARDWARE ACCELERATORS

(71) Applicant: International Business Machines Corporation, Armonk, NY (US)

(72) Inventors: Brenton F. Belmar, New Paltz, NY (US); Christian Jacobi, West Park, NY (US); Matthias Klein, Wappingers Falls, NY (US); Peter G. Sutton, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 27 days.

(21) Appl. No.: 15/873,963

(22) Filed: Jan. 18, 2018

(65) Prior Publication Data

US 2019/0220323 A1 Jul. 18, 2019

(51) Int. Cl.
*G06F 9/50* (2006.01)

(52) U.S. Cl.
CPC .......... *G06F 9/5044* (2013.01); *G06F 9/5077* (2013.01)

(58) Field of Classification Search
CPC .............................. G06F 9/5044; G06F 9/5077
See application file for complete search history.

(56) References Cited

U.S. PATENT DOCUMENTS

| | | | | |
|---|---|---|---|---|
| 5,969,726 A * | 10/1999 | Rentschler | ............ | G06T 15/005 345/419 |
| 6,362,828 B1 * | 3/2002 | Morgan | ................ | G06T 15/005 345/582 |
| 6,476,816 B1 * | 11/2002 | Deming | .................... | G06T 1/20 345/502 |
| 8,838,577 B2 * | 9/2014 | Sukhwani | ........... | H03M 7/3088 707/715 |
| 9,671,970 B2 * | 6/2017 | Mealey | ................. | G06F 3/0631 |
| 9,710,254 B2 | 7/2017 | Albot et al. | | |
| 2011/0041127 A1 * | 2/2011 | Kohlenz | ............... | G06F 9/4843 718/100 |
| 2012/0239904 A1 | 9/2012 | Ekanadham et al. | | |
| 2015/0199514 A1 * | 7/2015 | Tosa | ...................... | G06F 21/554 726/17 |

(Continued)

OTHER PUBLICATIONS

Anonymous, "Acceleration Virtualization Method for Hardware Accelerator", Aug. 8, 2011, Accessed on Nov. 13, 2017, http://ip.com/IPCOM/000209491D, 13 pp.

(Continued)

*Primary Examiner* — Benjamin C Wu
(74) *Attorney, Agent, or Firm* — Cantor Colburn; William Kinnaman

(57) ABSTRACT

An aspect includes hardware accelerator access. An application executing on a core of a multi-core processor triggers an interface code routine to acquire ownership of a hardware accelerator that is shared by a plurality of cores. The interface code routine partitions an input work package of the application into a plurality of pages in one or more input queues. The input work package is provided to the hardware accelerator in groups of one or more pages through the one or more input queues based on acquiring ownership of the hardware accelerator. An output work package is provided from the hardware accelerator in groups of one or more pages to the application.

24 Claims, 8 Drawing Sheets

(56) References Cited

U.S. PATENT DOCUMENTS

| | | | |
|---|---|---|---|
| 2016/0154677 A1* | 6/2016 | Barik | G06F 13/4239 |
| | | | 718/105 |
| 2016/0188751 A1* | 6/2016 | Agrawal | G06F 16/245 |
| | | | 707/741 |
| 2017/0153984 A1 | 6/2017 | Weissmann et al. | |
| 2018/0074994 A1* | 3/2018 | Anumula | G06F 15/7889 |

OTHER PUBLICATIONS

Anonymous, "Hardware Accelerator Mobility in Virtualized Environments", Oct. 6, 2016, Accessed on Nov. 13, 2017, http://ip.com/IPCOM/000247760D, 6 pp.

Gupta, Vishakha. "Pegasus: Coordinated Scheduling for Virtualized Accelerator-based Systems", Jun. 2011, www.usernix.org/ent/ate11/tech/finalfiles/-gupta.pdf, Accessed on Nov. 13, 2017, 14 pp.

M.J. Fitton, et al., "The Virtual Protocol Machine", AT&T Bell Laboratories Technical Journal, vol. 63, No. 8, Oct. 1984, 18 pp.

List of IBM Patents or Patent Applications Treated as Related, dated Aug. 6, 2019, 2 pages.

U.S. Appl. No. 16/527,441 filed Jul. 31, 2019, Entitled: Virtualized and Synchronous Access to Hardware Accelerators.

* cited by examiner

VIRTUALIZED AND SYNCHRONOUS ACCESS TO HARDWARE ACCELERATORS

BACKGROUND

The present invention generally relates to computer systems, and more specifically, to hardware accelerator access in computer systems.

In complex processing systems, hardware accelerator functions may be available to assist with performing support functions and freeing up primary processing resources to perform other tasks. Hardware accelerators are not typically directly accessible to application programs in environments where hardware accelerators are shared between multiple processing cores and application programs operate using different address space constraints. For instance, application programs performing operations in terms of logical or virtual addresses may not have visibility or access to physical addresses used by hardware accelerators.

SUMMARY

Embodiments of the present invention are directed to a computer-implemented method for hardware accelerator access. An application executing on a core of a multi-core processor triggers an interface code routine to acquire ownership of a hardware accelerator that is shared by a plurality of cores. The interface code routine partitions an input work package of the application into a plurality of pages in one or more input queues. The input work package is provided to the hardware accelerator in groups of one or more pages through the one or more input queues based on acquiring ownership of the hardware accelerator. An output work package is provided from the hardware accelerator in groups of one or more pages to the application.

Embodiments of the present invention are directed to a system including a hardware accelerator and a plurality of cores in a multi-core processor. The multi-core processor is configured to trigger, by an application executing on a core of the multi-core processor, an interface code routine to acquire ownership of the hardware accelerator that is shared by the plurality of cores. The interface code routine partitions an input work package of the application into a plurality of pages in one or more input queues. The input work package is provided to the hardware accelerator in groups of one or more pages through the one or more input queues based on acquiring ownership of the hardware accelerator. An output work package is provided from the hardware accelerator in groups of one or more pages to the application.

Embodiments of the present invention are directed to a computer program product, the computer program product including a computer readable storage medium having program instructions embodied therewith. In a non-limiting example, the program instructions are executable by processing circuitry to cause the processing circuitry to perform triggering, by an application executing on a core of a multi-core processor, an interface code routine to acquire ownership of a hardware accelerator that is shared by a plurality of cores. The interface code routine partitions an input work package of the application into a plurality of pages in one or more input queues. The input work package is provided to the hardware accelerator in groups of one or more pages through the one or more input queues based on acquiring ownership of the hardware accelerator. An output work package is provided from the hardware accelerator in groups of one or more pages to the application.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
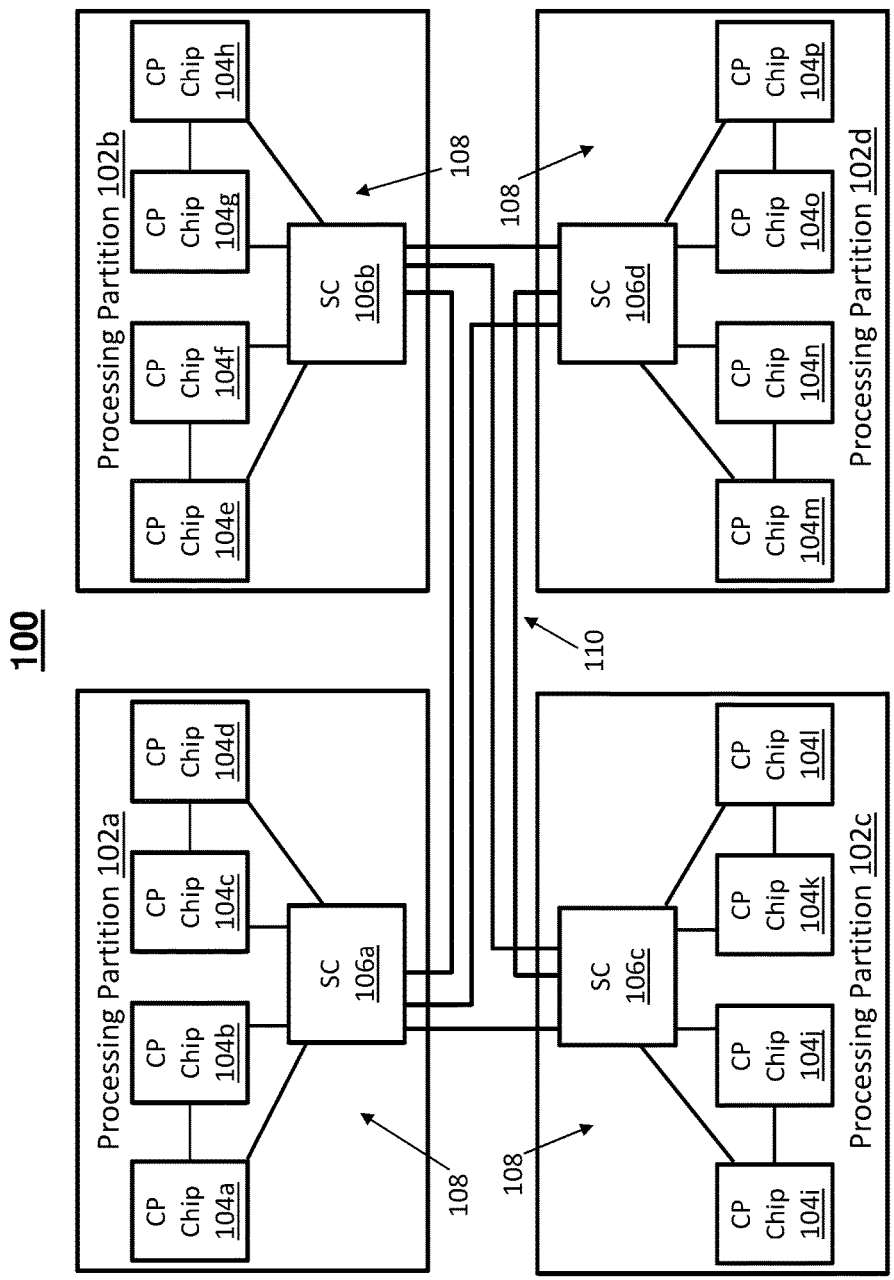
FIG. 1 depicts a system according to one or more embodiments.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, hardware accelerators may be available in a processing system to perform one or more specialized tasks. For example, a compression accelerator may be used to compress or decompress files and/or data structures in a storage system upon committing or retrieving data. Other examples of hardware accelerators can include graphics processing, various transforms, filtering, and/or other functions. A hardware accelerator may be shared between multiple processing cores to free up primary processing capability of the cores. When an application program desires to use a hardware accelerator, the application program typically requires additional support for addressing and to avoid resource contention. When operating system support is used to gain access to a hardware accelerator, the application program may have to operate asynchronously with respect to the hardware accelerator to ensure that the processing core remains responsive to system requests. Another reason to run asynchronously is the long execution time required if the accelerator resides "far away" from the processor core running the application that wants to use it (which occupies the processor and prevents it from doing any other work). The operating system may need to translate and "pin" memory pages to prevent memory address reallocation during hardware accelerator processing actions. The process of setting up memory pages a priori and providing absolute or physical addresses from the operating system to the hardware accelerator can increase system burdens. Further, task/context switching involved with operating the application program asynchronously with respect to the hardware accelerator can increase processing overhead.

Turning now to an overview of the aspects of the invention, one or more embodiments of the invention address the above-described shortcomings of the prior art by providing an interface code routine between an application and a shared hardware accelerator. The interface code routine can be implemented in low-level code (e.g., firmware/millicode) and may appear as a function call instruction to the application. The interface code routine can handle interfacing aspects, such as address translation, progress monitoring, system request monitoring, and the like. The use of the interface code routine allows the application to operate synchronously with respect to the hardware accelerator and avoids potential overhead and delays associated with operating system calls and the pinning of large blocks of memory (e.g., spanning multiple memory pages) to prevent page reallocation during accelerator operation.

The above-described aspects of the invention address the shortcomings of the prior art by performing address translation in reduced block sizes over one or more memory pages as needed. Rather than performing complete address translation for a large memory block of an input work package for a hardware accelerator, embodiments can partition an input work package of the application into a plurality of pages in one or more input queues. Address translation can be performed for the queued pages, while pages that have not yet been queued or operated upon are free to be relocated as needed by the operating system and/or a memory management function. The interface code routine can provide address translated input/output pages through one or more input queues and one or more output queues such that the application and the hardware accelerator operate in expected address spaces without requiring knowledge of physical-virtual address mapping by the application or the hardware accelerator. Technical effects and benefits include synchronous execution of hardware accelerator accesses, a reduced number of address page translations at a given point in time, and continued responsiveness to system requests while the hardware accelerator is running.

Turning now to a more detailed description of aspects of the present invention, FIG. 1 depicts an example of a system 100 according to embodiments of the invention. The system 100 can be part of a processing complex and may include a plurality of processing partitions 102a, 102b, 102c, 102d. The processing partitions 102a-102d can be physical partitions, such as drawers, that separate various processing and control resources. In the example of FIG. 1, processing partition 102a includes a plurality of computer processor (CP) chips 104a, 104b, 104c, and 104d. The CP chips 104a-104d can be partitioned into clusters on two or more separate buses 108 that interface with a system controller (SC) 106a that is shared by the CP chips 104a-104d. Similarly, processing partition 102b includes a plurality of CP chips 104e, 104f, 104g, and 104h that can be partitioned into clusters on two or more separate buses 108 that interface with a SC 106b shared by the CP chips 104e-104h. Processing partition 102c includes a plurality of CP chips 104i, 104j, 104k, and 104l that can be partitioned into clusters on two or more separate buses 108 that interface with a SC 106c shared by the CP chips 104i-104l. Processing partition 102d includes a plurality of CP chips 104m, 104n, 104o, and 104p that can be partitioned into clusters on two or more separate buses 108 that interface with a SC 106d shared by the CP chips 104m-104p. SCs 106a-106d are interconnected by a communication fabric 110 that enables cross-bus movement between the CP chips 104a-104p and SCs 106a-106d of processing partitions 102a-102d. While the example of FIG. 1 includes four CP chips 104 per processing partition 102, it will be understood that other configurations are contemplated. For example, there may be six or eight CP chips 104 per processing partition 102, and there may be an even or odd number of processing partitions 102 (e.g., five processing partitions 102).

Figure 2:
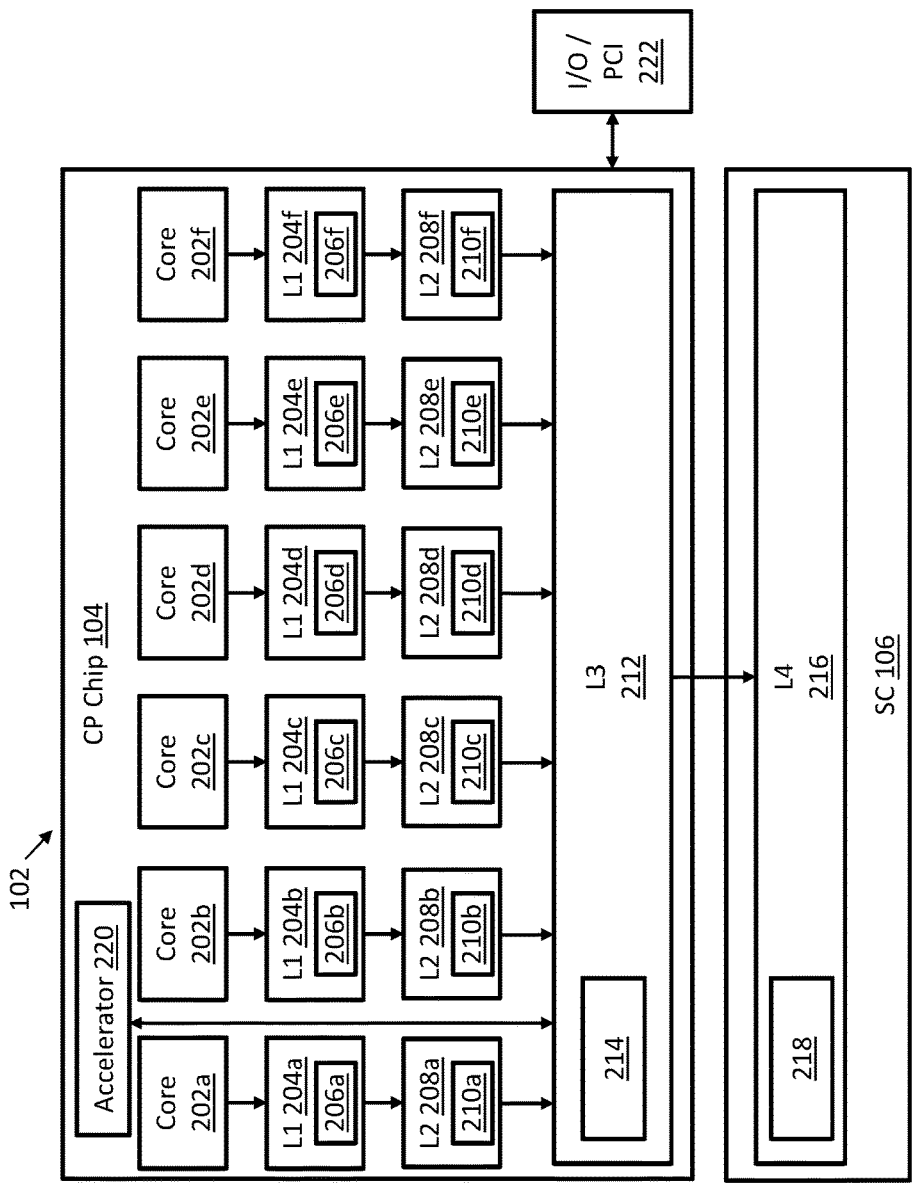
FIG. 2 depicts a portion of a processing partition according to one or more embodiments.

Referring now to FIG. 2, each CP chip 104 of each processing partition 102, such as CP chip 104a in processing partition 102a of FIG. 1, includes one or more cores 202 for the reading and executing of instructions, and thus is also referred to as a multi-core processor 104. For example, and, in the embodiment shown in FIG. 2, CP chip 104 includes six cores 202a, 202b, 202c, 202d, 202e, and 202f It should be understood that any number of cores may be included. In the example of FIG. 2, each core 202a-202f is operatively coupled to a level one (L1) cache, such as L1 caches 204a, 204b, 204c, 204d, 204e, and 206f, and a level two (L2) cache, such as L2 caches 208a, 208b, 208c, 208d, 208e, and 208f For example, core 202a is operatively coupled to L1 cache 204a and to L2 cache 208a. Specifically, the L1 caches 204a-204f are respectively coupled to the cores 202a-202f, and the L2 caches 208a-208f are respectively coupled to the L1 caches 204a-204f Each of L1 caches 204a-204f can include a respective L1 cache control, such as L1 cache controls 206a, 206b, 206c, 206d, 206e, and 206f Each of the L2 caches 208a-208f can includes an L2 cache control, such as L2 cache controls 210a, 210b, 210c, 210d, 210e, and 210f Each L2 cache 208a-208f is operatively coupled to a level three (L3) cache 212, such that one L3 cache 212 is included in each CP chip 104. Each L3 cache 212 is shared by multiple L2 caches 208a-208f The L3 cache 212 also includes an L3 cache control 214.

Each level four (L4) cache 216 is shared by one or more L3 caches 212 from each CP chip 104 within the same processing partition 102. In this example, L4 cache 216 is shared by L3 cache 212 of CP chip 104. The L4 cache 216 can reside in or be coupled to SC 106, such as SC 106a of FIG. 1. Each L4 cache 216 can include an L4 cache control 218.

It should be understood that other cache sizes may be used as well. It should also be understood that although FIG. 2 illustrates a multi-level cache hierarchy having four levels of cache, any number of cache levels may be included in the system 100 of FIG. 1. It should also be understood that while FIG. 2 illustrates the highest, or last, level cache as L4 cache, the highest level cache on the processing partitions 102a-102d of FIG. 1 may be a lower, or higher, cache level (for example, an L3 cache may be the highest level cache). Moreover, each processing partition 102a-102d of FIG. 1 may be configured with a different highest level cache such that one processing partition 102 has an L4 cache as its highest level cache and another processing partition 102 has an L3 cache as its highest level cache.

In the example of FIG. 2, at least one hardware accelerator 220 is shared and can be accessed by any of the cores 202a-202f. For instance, L3 cache 212 may form a coherency fabric for accesses of the hardware accelerator 220 by cores 202a-202f. The hardware accelerator 220 may also have connectivity to one or more resources, such as an input/output (I/O) bus and/or peripheral component interconnect (PCI) bus 222. The hardware accelerator 220 can provide support functions to invoke one or more accelerator work action on data provided by one or more cores 202a-202f and/or data from the I/O/PCI bus 222. Although the example of FIG. 2 depicts six cores 202a-202f within the CP chip 104, it will be understood that other configurations are contemplated. Further, the hardware accelerator 220 can be within CP chip 104 or external to the CP chip 104. Additionally, there may be multiple hardware accelerators 220 accessible by one or more of the cores 202a-202f.

Figure 3:
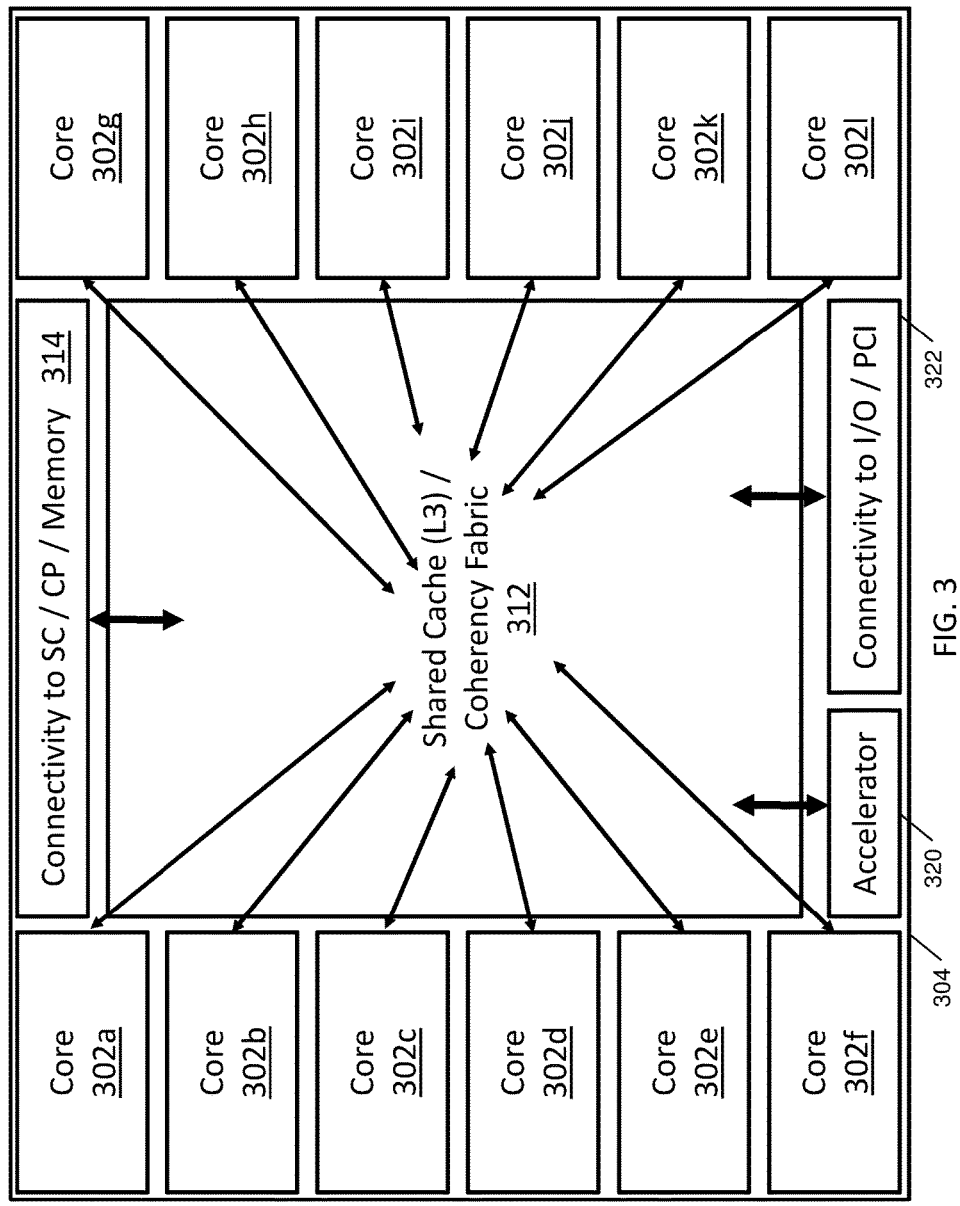
FIG. 3 depicts a multi-core processor according to one or more embodiments.

FIG. 3 depicts an alternate example of a CP chip as CP chip 304 that includes twelve cores 302a, 302b, 302c, 302d, 302e, 302f, 302g, 302h, 302i, 302j, 302k, and 302l operable to interface through a shared cache (L3)/coherency fabric 312. The CP chip 304 is also referred to as a multi-core processor 304. The coherency fabric 312 can provide connectivity 314 to an SC, other CP chips, and/or memory as well as connectivity 322 to I/O and/or PCI buses and access to a hardware accelerator 320. The coherency fabric 312 can refer to any type of shared access/arbitration logic that allows for the sharing of data between multiple elements of the CP chip 304 and may be implemented as a level-3 cache with respect to the cores 302a-302l. Further, there can be multiple instances of the hardware accelerator 320 in the CP chip 304.

Figure 4:
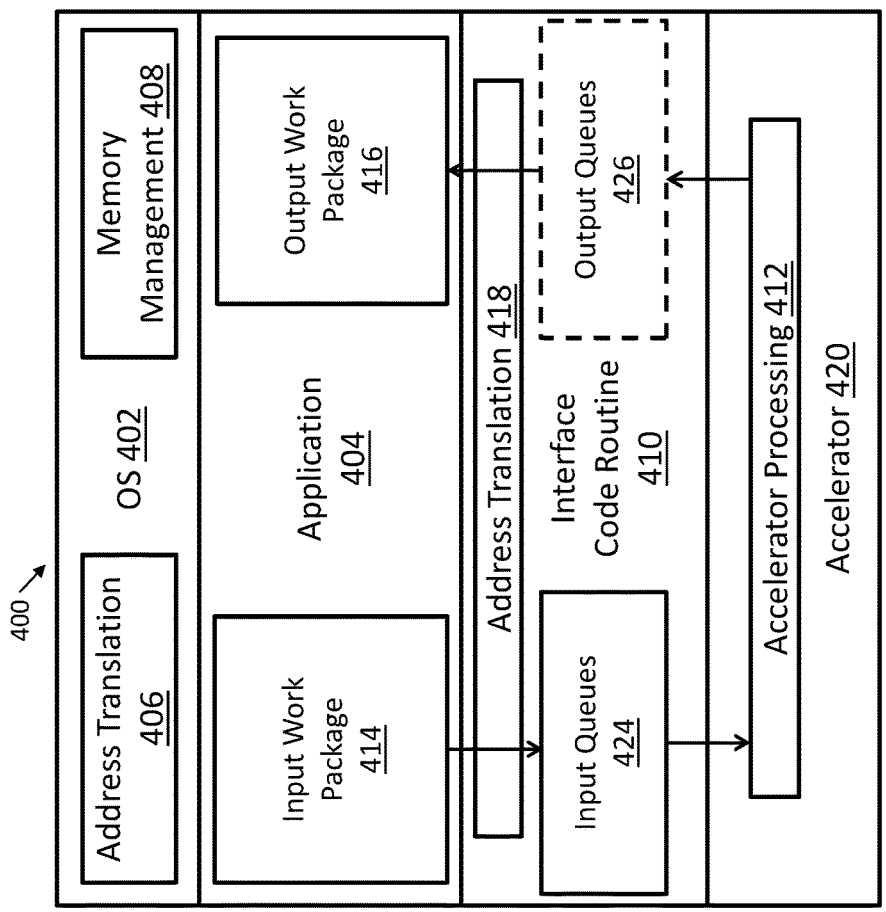
FIG. 4 depicts a block diagram of a data flow according to one or more embodiments.

FIG. 4 depicts a block diagram of a data flow 400 that may be implemented in the embodiments of FIGS. 1-3. An operating system 402 may execute on one or more of the cores 202, 302 of FIGS. 2 and 3 along with at least one application 404. The operating system 402 can have support functions, such as address translation 406 and memory management 408 to efficiently manage the memory allocated to the application 404 and additional applications (not depicted). For instance, as applications start, execute, and complete, the physical memory locations assigned to the application 404 may change. Since the application 404 operates in terms of virtual (or logical) addresses, the application 404 is not typically concerned with the actual physical location of resources. Rather than making a request to the operating system 402 to access a hardware accelerator 420 (e.g., an embodiment of hardware accelerator 220, 320), the application 404 can make a call to an interface code routine 410 to trigger accelerator processing 412 to perform accelerator work actions, such as performing data compression on large blocks of data (e.g., >=250 kbytes) in an input work package 414 from one of the cores 202a-202f, 302a-302l and may provide results back to the application 404 running on one of the cores 202a-202f, 302a-302l as an output work package 416. Although depicted in FIG. 4 as being in close proximity, the hardware accelerator 420 may be located in a different processor or otherwise be remotely accessible by the interface code routine 410, e.g., through buses 108 and/or communication fabric 110 of FIG. 1. The operating system 402, application 404, and interface code routine 410 can be instances of code running on any of the cores 202a-202f, 302a-302l, while the accelerator 420 can be hardware external to the cores 202a-202f, 302a-302l. Anything within a core may access core translation facilities (so the interface code routine 410 can use address translation facilities such as a translation lookaside buffer while the hardware accelerator 420 outside of the core does not have this capability/access).

The interface code routine 410 can include address translation 418, one or more input queues 424, and one or more output queues 426. The interface code routine 410 can be low-level code, such as firmware or millicode. The interface code routine 410 can arbitrate access to the hardware accelerator 420 and initiate set-up of the hardware accelerator 420. For instance, a semaphore or time-sliced access can be used to determine when the interface code routine 410 can acquire ownership of the hardware accelerator 420 that is shared by a plurality of cores 202a-202f, 302a-302l. The interface code routine 410 can access pages of the input work package 414 in a virtual address space from the application 404 and use address translation 418 to convert the virtual addresses to addresses formatted as expected by the hardware accelerator 420 (such as absolute addresses, physical addresses, or an alternate virtual addressing scheme, for example). The address translation 418 can use one or more translation lookaside buffers or other structures known in the art to map between virtual and physical addresses. One or more translated page addresses (i.e., identifying a subset of the input work package 414) can be queued in the input queues 424 in an address space for consumption by accelerator processing 412 of the hardware accelerator 420. In some embodiments, the input queues 424 and the output queues 426 are translated address lists that inform the hardware accelerator 420 where to read the input work package 414 and where to write the output work package 416 to in a physical or absolute address format. In other embodiments, the input queues 424 and the output queues 426 transfer blocks of data rather than or in addition to addresses. The input queues 424 and the output queues 426 need not be separate memory regions or dedicated physical buffers and may be implemented in any memory accessible by the interface code routine 410. Providing data a physical or absolute address space allows the hardware accelerator 420 to directly perform operations and work upon/store the data without requiring additional translations by the hardware accelerator 420. In embodiments, the hardware accelerator 420 does not have access to the address translation 406 or address translation 418. The memory management 408 is able to move data page locations of the input work package 414 that are not currently queued in the input queues 424 such that efficient memory utilization is not excessively constrained while the hardware accelerator 420 is active. Address translation 418 can perform logical-to-physical address mapping on a page basis as groups of pages are ready to be consumed by the hardware accelerator 420 and ready to be written back to the output work package 416.

Data in the input queues 424 can be provided to the hardware accelerator 420 by actively sending/pushing the data or providing the hardware accelerator 420 with address information as to where data in the input queues 424 can be directly accessed in the physical address space. The input queues 424 can operate on a single page basis or on a page group basis (e.g., 2, 4, 6, 8 pages at a time, etc.). Processing results of the accelerator processing 412 can be provided (sent/pushed/written) to the output queues 426 in the physical address space or may be written back to the output work package 416 based on target addresses queued in the output queue 426. Address translation 418 of the interface code routine 410 can perform address translation from logical to physical addresses as pages are to be written in the output work package 416. The output queues 426 can list translated addresses in a format understood by the hardware accelerator 420 as the next address/addresses to use for writing output of the hardware accelerator 420 into the output work package 416. Alternatively, the output queues 426 can hold data provided by the hardware accelerator 420 prior to writing the data to the output work package 416. It will be understood that various methods of data transfer can occur between the application 404, interface code routine 410, and the hardware accelerator 420, such as coherency fabric fetching, use of dedicated wires, memory-mapped I/O writes, and other such techniques.

Figure 5:
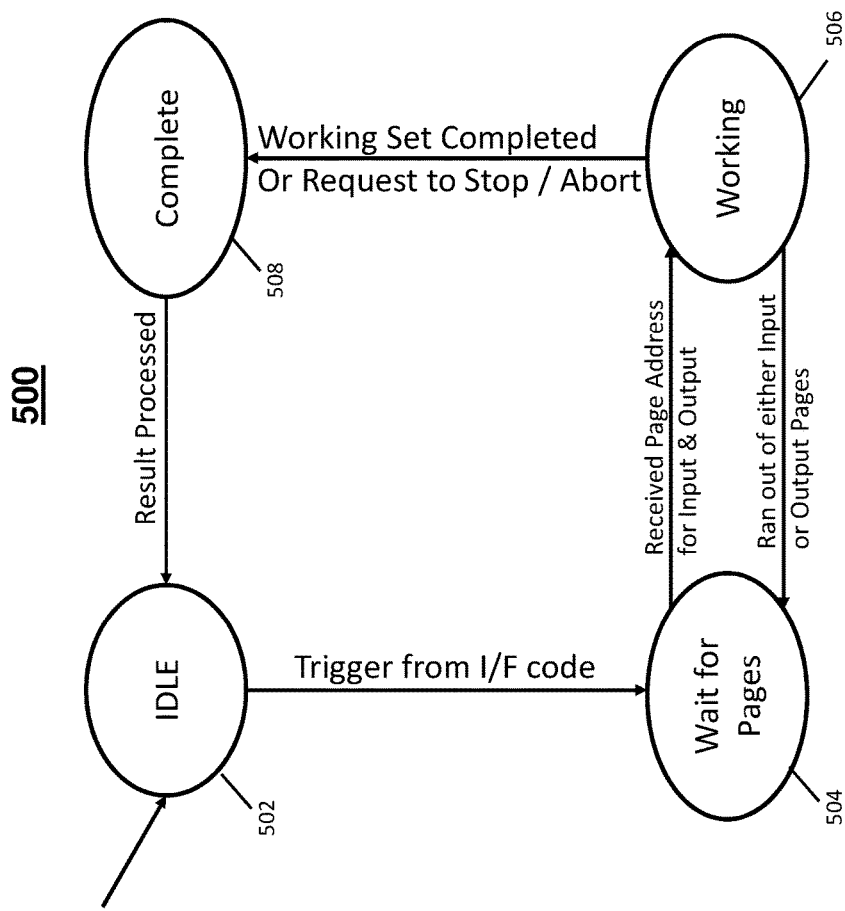
FIG. 5 depicts a hardware accelerator state diagram according to one or more embodiments.

FIG. 5 depicts a hardware accelerator state diagram 500 according to an embodiment and is described in reference to FIGS. 1-4. Initially, the hardware accelerator 420 waits in an idle state 502. Upon being triggered from the interface code routine 410, the hardware accelerator 420 transitions to a waiting state 504 to wait for pages to arrive via the input queues 424 with physical page addresses. As physical pages addresses are received for the input queues 424 and the output queues 426, the hardware accelerator 420 transitions to a working state 506. If additional pages are expected and the hardware accelerator 420 runs out of input or output pages in the input queues 424 and the output queues 426, then the hardware accelerator 420 transitions back to the waiting state 504. When the working set is complete or a request to stop or abort is received in the working state 506, the hardware accelerator 420 transitions to a complete state 508. Results are processed and the hardware accelerator 420 transitions from the complete state 508 back to the idle state 502. It will be understood that additional states can be included and the states of FIG. 5 can be further decomposed to separately handle differences between input and output pages. The hardware accelerator 420 can continuously provide status back to the interface code routine 410 to indicate ready/busy/completion status, for example.

Figure 6:
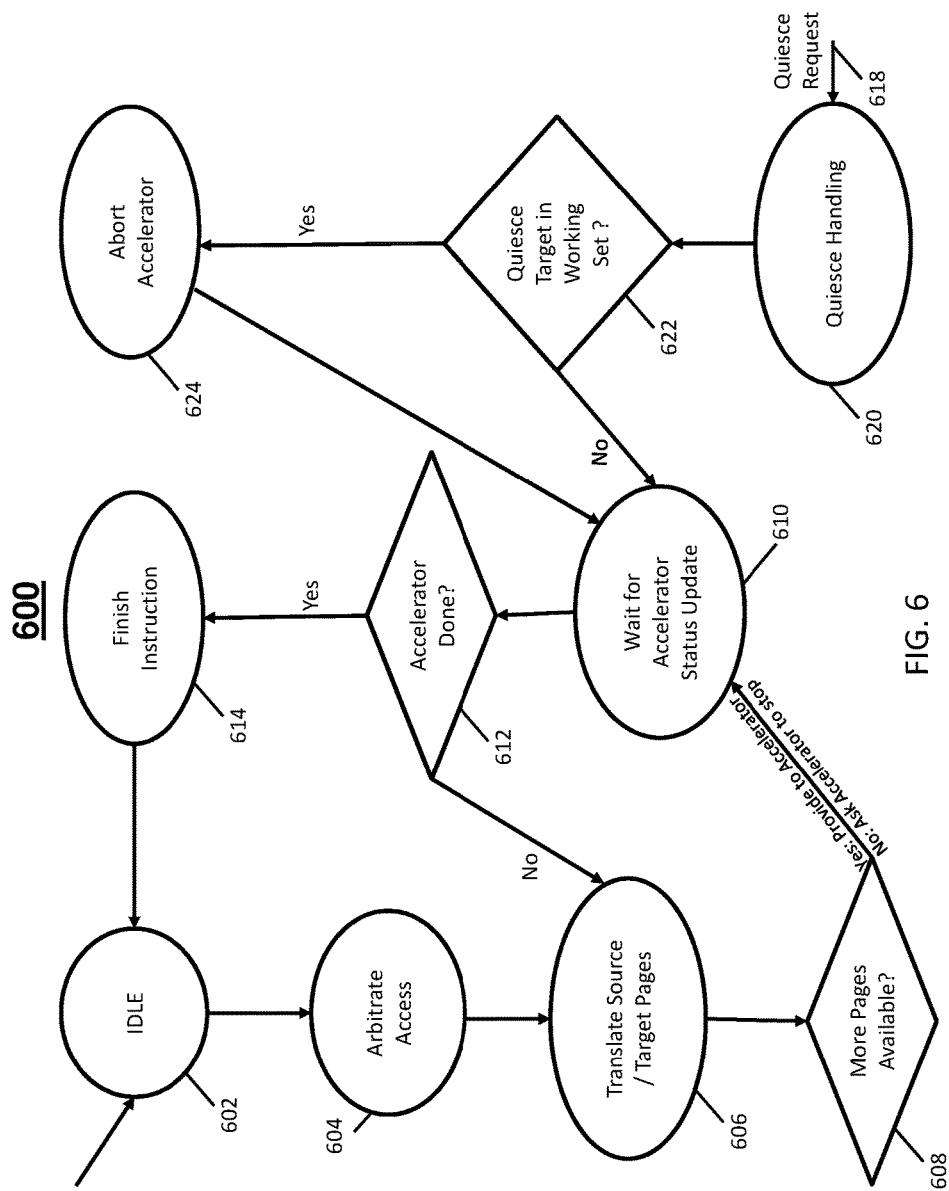
FIG. 6 depicts an interface code routine state diagram according to one or more embodiments.

Turning now to FIG. 6, an interface code routine state diagram 600 is generally shown in accordance with an embodiment and with continued reference to FIGS. 1-5. The interface code routine state diagram 600 illustrates an example of a number of actions that can be taken by the interface code routine 410 of FIG. 4 while providing addresses to the hardware accelerator 420 of FIG. 4 to support accelerator actions on data pages while also being responsive to system requests. The interface code routine 410 may be in an idle state 602 until being triggered by the application 404 of FIG. 4 to acquire ownership of the hardware accelerator 420 that is shared by a plurality of cores 202a-202f, 302a-302l and transition to state 604. At state 604, the interface code routine 410 arbitrates access to the hardware accelerator 420 with respect to the cores 202a-202f, 302a-302l. Upon securing ownership of the hardware accelerator 420, a transition to state 606 can occur. An input work package 414 of the application 404 can be partitioned into a plurality of pages in one or more input queues 424.

At state 606, source translation of target pages can occur using address translation 418 as the input work package 414 is provided to the hardware accelerator 420 in groups of one or more pages through the one or more input queues 424 based on acquiring ownership of the hardware accelerator 420. As pages are passed through the input queues 424, state 608 can monitor to determine if more pages are available. If more pages are available, the additional pages are provided to the hardware accelerator 420, and if no more pages are available, the hardware accelerator 420 is asked to stop, with both results transitioning to state 610. At state 610, the interface code routine 410 waits for a status update from the hardware accelerator 420. If the hardware accelerator 420 indicates that an accelerator action is not done at state 612, then a return to state 606 is performed. Otherwise, if the hardware accelerator 420 indicates that an accelerator action is done at state 612, then a finish instruction operation can be performed at state 614 before transitioning back to state 602. The finish instruction operation at state 614 can include performing address translation 418 from output queues 426 to the output work package 416 in a virtual address space of the application 404. In some embodiments, target page addresses can be provided to the hardware accelerator 420 through the output queues 426 as absolute addresses corresponding to the virtual addresses of the output work package 416. When the hardware accelerator 420 is finished, the desired target data has already arrived in the output work package 416 when address pointers are used instead of data passing through the output queues 426.

In embodiments, the interface code routine 410 handles system level requests while the hardware accelerator 420 is active. For example, a quiesce request 618 can be received by the interface code routine 410 at state 620. The quiesce request 618 is an example of a system level request that may be received, for example, from the operating system 402 to pause operations as part of invalidating a page translation due to memory page reallocation. At state 622, the interface code routine 410 can determine whether the quiesce targets data in a portion of a working set currently being worked on by the hardware accelerator 420 (e.g., in the input queues 424 or the output queues 426). In some embodiments, the state 622 includes a check whether the quiesce target is in either of the input work package 414 or the output work package 416. If the quiesce target is not in a working set at state 622, then a transition to state 610 can occur to wait for a status update of the hardware accelerator 420. If the quiesce target is in a working set at state 622, then a hardware accelerator abort action can be performed at state 624, followed by a return to state 610 to wait for a status update of the hardware accelerator 420. In some embodiments, if portions of the input work package 414 or output work package 416 are affected by a system level action, an associated operation of the hardware accelerator 420 can be nullified and the operation repeated.

Figure 7:
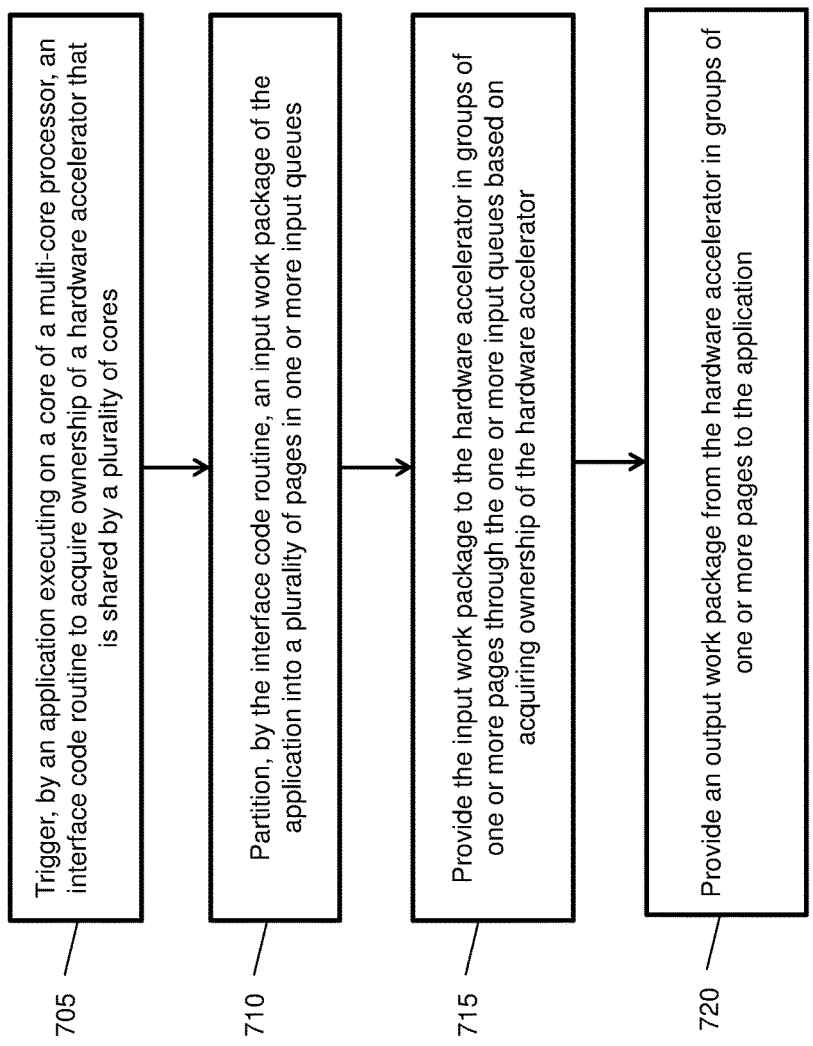
FIG. 7 depicts an example process flow according to one or more embodiments.

Turning now to FIG. 7, a flow diagram of a process 700 for hardware accelerator access is generally shown in accordance with an embodiment. The process 700 is described with reference to FIGS. 1-6 and may include additional steps beyond those depicted in FIG. 7.

At block 705, an application executing 404 on a core 202, 302 of a multi-core processor 104, 304 triggers an interface code routine 410 to acquire ownership of a hardware accelerator 420 that is shared by the plurality of cores 202a-202f, 302a-302l.

At block 710, the interface code routine 410 partitions an input work package 414 of the application 404 into a plurality of pages in one or more input queues 424.

At block 715, the input work package 414 is provided to the hardware accelerator 420 in groups of one or more pages through the one or more input queues 424 based on acquiring ownership of the hardware accelerator 420. The interface code routine 410 can translate an address space of the input work package 414 from a virtual address space of the application 404 to an address space of the hardware accelerator 420. Translating the address space can be performed using address translation 418 as the groups of one or more pages are written to the one or more input queues 424. The hardware accelerator 420 can access or receive data from the one or more input queues 424 in the address space.

At block 720, an output work package 416 is provided from the hardware accelerator 420 in groups of one or more pages to the application 404. The hardware accelerator 420 can send or write the groups of one or more pages through the one or more output queues 426 in the address space responsive to performing an accelerator work action by accelerator processing 412. The accelerator work action can be, for example, data compression, graphics processing, a data transform, a filtering operation, and/or other such tasks. The interface code routine 410 can translate the groups of one or more pages or addresses of the output work package 416 in the one or more output queues 426 using address translation 418. The hardware accelerator 420 may store directly to the output work package 416 where the output queues 426 already contained the absolute addresses of target write addresses for the output work package 416.

The interface code routine 410 can monitor a completion status of the hardware accelerator 420 based on providing the input work package 414 to the hardware accelerator 420 in the groups of one or more pages through the one or more input queues 424. One or more additional groups of one or more pages can be provided through the one or more input queues 424 based on determining that the hardware accelerator 420 is ready for additional pages. Ownership of the hardware accelerator 420 can be released based on determining that the input work package 414 has been fully provided to the hardware accelerator 420 and the completion status of the hardware accelerator 420 indicates that processing is complete.

The interface code routine 410 can also monitor for a quiesce request received at the interface code routine 410 to invalidate at least one page of the one or more input queues 424 having incomplete processing by the hardware accelerator 420. The hardware accelerator 420 can be signaled to abort an accelerator work action based on determining that the quiesce request invalidates at least one page of the one or more input queues 424 having incomplete processing by the hardware accelerator 420. The interface code routine 410 can also monitor for a translation invalidation request, for instance, to update a translation lookaside buffer or other table used by the address translation 418 to determine a mapping between virtual and physical addresses. A translation invalidation action can be delayed by the interface code routine 410 based on determining that the translation invalidation request is associated with an address queued for use by the hardware accelerator 420. For instance, if the hardware accelerator 420 is about to work on a page to be invalidated, the interface code routine 410 can wait for the hardware accelerator 420 to complete work on the page before acting on the invalidation request. The interface code routine 410 can also handle page faults and other such issues.

Figure 8:
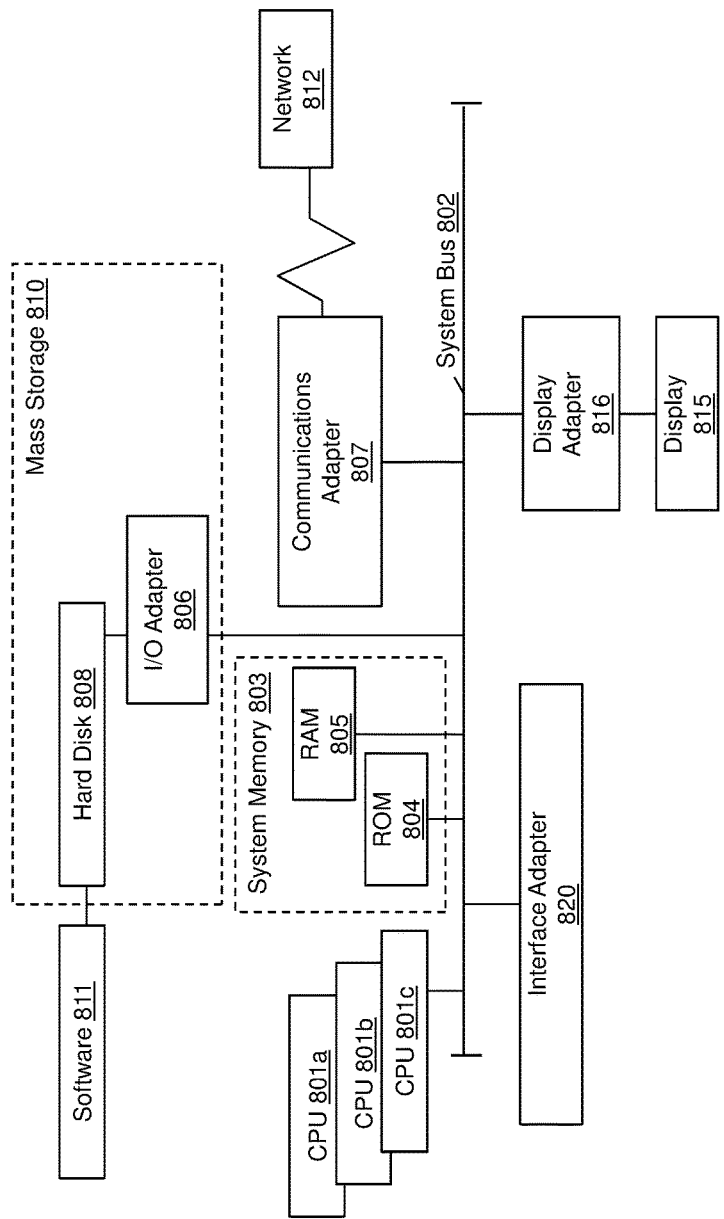
FIG. 8 depicts a processing system in accordance with one or more embodiments.

Referring now to FIG. 8, there is shown an embodiment of a processing system 800 for implementing the teachings herein. In this embodiment, the processing system 800 has one or more central processing units (processors) 801a, 801b, 801c, etc. (collectively or generically referred to as processor(s) 801) that can be an embodiment of the CP chips 104, 304 and/or other processing circuitry within the processing partitions 102a-102d of FIGS. 1-3. The processors 801, also referred to as processing circuits/circuitry, are coupled via a system bus 802 to a system memory 803 and various other components (such as SC 106a-106d of FIG. 1). The system memory 803 can include read only memory (ROM) 804 and random access memory (RAM) 805. The ROM 804 is coupled to system bus 802 and may include a basic input/output system (BIOS), which controls certain basic functions of the processing system 800. RAM 805 is read-write memory coupled to system bus 802 for use by the processors 801.

FIG. 8 further depicts an input/output (I/O) adapter 806 and a communications adapter 807 coupled to the system bus 802. I/O adapter 806 may be a small computer system interface (SCSI) adapter that communicates with a hard disk 808 and/or any other similar component. I/O adapter 806 and hard disk 808 are collectively referred to herein as mass storage 810. Software 811 for execution on the processing system 800 may be stored in mass storage 810. The mass storage 810 is an example of a tangible storage medium readable by the processors 801, where the software 811 is stored as instructions for execution by the processors 801 to perform a method, such as the processes 500-700 of FIGS. 5-7. Communications adapter 807 interconnects the system bus 802 with an outside network 812 enabling processing system 800 to communicate with other such systems. A display 815 is connected to system bus 802 via a display adapter 816, which may include a graphics controller to improve the performance of graphics intensive applications and a video controller. In one embodiment, adapters 806, 807, and 816 may be connected to one or more I/O buses that are connected to the system bus 802 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices can be connected to the system bus 802 via an interface adapter 820 and the display adapter 816. A keyboard, mouse, speaker can be interconnected to the system bus 802 via the interface adapter 820, which may include, for example, a Super I/O chip integrating multiple device adapters into a single integrated circuit.

Thus, as configured in FIG. 8, the processing system 800 includes processing capability in the form of processors 801, and, storage capability including the system memory 803 and the mass storage 810, input means such as keyboard and mouse, and output capability including speaker and the display 815. In one embodiment, a portion of the system memory 803 and the mass storage 810 collectively store an operating system, such as the z/OS or AIX operating system from IBM Corporation, to coordinate the functions of the various components shown in FIG. 8.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   triggering, by an application executing on a core of a multi-core processor, an interface code routine to acquire ownership of a hardware accelerator that is shared by a plurality of cores;
   partitioning, by the interface code routine, an input work package of the application into a plurality of pages in one or more input queues;
   providing the input work package to the hardware accelerator in groups of one or more pages through the one or more input queues based on acquiring ownership of the hardware accelerator; and
   providing an output work package from the hardware accelerator in groups of one or more pages to the application.

2. The computer-implemented method of claim 1, further comprising:
   translating, by the interface code routine, an address space of the input work package from a virtual address space of the application to an address space of the hardware accelerator.

3. The computer-implemented method of claim 2, wherein translating the address space is performed as the groups of one or more pages or absolute page addresses are written to the one or more input queues.

4. The computer-implemented method of claim 3, wherein the hardware accelerator accesses or receives data from the one or more input queues in the address space, and the hardware accelerator sends or writes the groups of one or more pages through one or more output queues in the address space responsive to performing an accelerator work action.

5. The computer-implemented method of claim 4, further comprising:
   translating, by the interface code routine, one or more target addresses of the output work package for storing the groups of one or more pages from the hardware accelerator.

6. The computer-implemented method of claim 1, further comprising:
   monitoring, by the interface code routine, a completion status of the hardware accelerator based on providing the input work package to the hardware accelerator in the groups of one or more pages through the one or more input queues;
   providing one or more additional groups of one or more pages through the one or more input queues based on determining that the hardware accelerator is ready for additional pages; and
   releasing ownership of the hardware accelerator based on determining that the input work package has been fully provided to the hardware accelerator and the completion status of the hardware accelerator indicates that processing is complete.

7. The computer-implemented method of claim 6, further comprising:
   monitoring for a quiesce request received at the interface code routine to invalidate at least one page of the one or more input queues having incomplete processing by the hardware accelerator; and
   signaling the hardware accelerator to abort an accelerator work action based on determining that the quiesce request invalidates at least one page of the one or more input queues having incomplete processing by the hardware accelerator.

8. The computer-implemented method of claim 1, further comprising:
   monitoring, by the interface code routine, for a translation invalidation request; and
   delaying a translation invalidation action based on determining that the translation invalidation request is associated with an address queued for use by the hardware accelerator.

9. A system comprising:
   a hardware accelerator; and
   a plurality of cores in a multi-core processor, wherein the multi-core processor is configured to:
     trigger, by an application executing on a core of the multi-core processor, an interface code routine to acquire ownership of the hardware accelerator that is shared by the plurality of cores;
     partition, by the interface code routine, an input work package of the application into a plurality of pages in one or more input queues;
     provide the input work package to the hardware accelerator in groups of one or more pages through the one or more input queues based on acquiring ownership of the hardware accelerator; and provide an output work package from the hardware accelerator in groups of one or more pages to the application.

10. The system of claim 9, wherein the multi-core processor is further configured to translate, by the interface code routine, an address space of the input work package from a virtual address space of the application to an address space of the hardware accelerator.

11. The system of claim 10, wherein translation of the address space is performed as the groups of one or more pages or absolute page addresses are written to the one or more input queues.

12. The system of claim 11, wherein the hardware accelerator accesses or receives data from the one or more input queues in the address space, and the hardware accelerator sends or writes the groups of one or more pages through one or more output queues in the address space responsive to performing an accelerator work action.

13. The system of claim 12, wherein the multi-core processor is further configured to translate, by the interface code routine, one or more target addresses of the output work package for storing the groups of one or more pages from the hardware accelerator.

14. The system of claim 9, wherein the multi-core processor is further configured to:
monitor, by the interface code routine, a completion status of the hardware accelerator based on providing the input work package to the hardware accelerator in the groups of one or more pages through the one or more input queues;
provide one or more additional groups of one or more pages through the one or more input queues based on determining that the hardware accelerator is ready for additional pages; and
release ownership of the hardware accelerator based on determining that the input work package has been fully provided to the hardware accelerator and the completion status of the hardware accelerator indicates that processing is complete.

15. The system of claim 14, wherein the multi-core processor is further configured to:
monitor for a quiesce request received at the interface code routine to invalidate at least one page of the one or more input queues having incomplete processing by the hardware accelerator; and
signal the hardware accelerator to abort an accelerator work action based on determining that the quiesce request invalidates at least one page of the one or more input queues having incomplete processing by the hardware accelerator.

16. The system of claim 9, wherein the multi-core processor is further configured to:
monitor, by the interface code routine, for a translation invalidation request; and
delay a translation invalidation action based on determining that the translation invalidation request is associated with an address queued for use by the hardware accelerator.

17. A computer program product comprising a computer readable storage medium having program instructions embodied therewith, the program instructions executable by processing circuitry to cause the processing circuitry to perform:
triggering, by an application executing on a core of a multi-core processor, an interface code routine to acquire ownership of a hardware accelerator that is shared by a plurality of cores;
partitioning, by the interface code routine, an input work package of the application into a plurality of pages in one or more input queues;
providing the input work package to the hardware accelerator in groups of one or more pages through the one or more input queues based on acquiring ownership of the hardware accelerator; and
providing an output work package from the hardware accelerator in groups of one or more pages to the application.

18. The computer program product of claim 17, wherein the program instructions executable by processing circuitry further cause the processing circuitry to perform:
translating, by the interface code routine, an address space of the input work package from a virtual address space of the application to an address space of the hardware accelerator.

19. The computer program product of claim 18, wherein translating the address space is performed as the groups of one or more pages or absolute page addresses are written to the one or more input queues.

20. The computer program product of claim 19, wherein the hardware accelerator accesses or receives data from the one or more input queues in the address space, and the hardware accelerator sends or writes the groups of one or more pages through the one or more output queues in the address space responsive to performing an accelerator work action.

21. The computer program product of claim 20, wherein the program instructions executable by processing circuitry further cause the processing circuitry to perform:
translating, by the interface code routine, one or more target addresses of the output work package for storing the groups of one or more pages from the hardware accelerator.

22. The computer program product of claim 17, wherein the program instructions executable by processing circuitry further cause the processing circuitry to perform:
monitoring, by the interface code routine, a completion status of the hardware accelerator based on providing the input work package to the hardware accelerator in the groups of one or more pages through the one or more input queues;
providing one or more additional groups of one or more pages through the one or more input queues based on determining that the hardware accelerator is ready for additional pages; and
releasing ownership of the hardware accelerator based on determining that the input work package has been fully provided to the hardware accelerator and the completion status of the hardware accelerator indicates that processing is complete.

23. The computer program product of claim 22, wherein the program instructions executable by processing circuitry further cause the processing circuitry to perform:
monitoring for a quiesce request received at the interface code routine to invalidate at least one page of the one or more input queues having incomplete processing by the hardware accelerator; and
signaling the hardware accelerator to abort an accelerator work action based on determining that the quiesce request invalidates at least one page of the one or more input queues having incomplete processing by the hardware accelerator.

24. The computer program product of claim 17, wherein the program instructions executable by processing circuitry further cause the processing circuitry to perform:

monitoring, by the interface code routine, for a translation invalidation request; and delaying a translation invalidation action based on determining that the translation invalidation request is associated with an address queued for use by the hardware accelerator.

* * * * *